United States Patent
Champy

(10) Patent No.: US 11,936,960 B2
(45) Date of Patent: *Mar. 19, 2024

(54) METHODS, SYSTEMS AND MEDIA FOR INTERACTING WITH CONTENT USING A SECOND SCREEN DEVICE

(71) Applicant: Google LLC, Mountain View, CA (US)

(72) Inventor: Adam Champy, New York, NY (US)

(73) Assignee: Google LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/575,750

(22) Filed: Jan. 14, 2022

(65) Prior Publication Data

US 2022/0141546 A1    May 5, 2022

Related U.S. Application Data

(63) Continuation of application No. 16/600,902, filed on Oct. 14, 2019, now Pat. No. 11,228,816, which is a
(Continued)

(51) Int. Cl.
*H04N 21/6587* (2011.01)
*G06F 3/0346* (2013.01)
(Continued)

(52) U.S. Cl.
CPC ....... *H04N 21/6587* (2013.01); *G06F 3/0346* (2013.01); *G06F 16/438* (2019.01);
(Continued)

(58) Field of Classification Search
CPC ............... H04N 21/00; H04N 21/6587; H04N 21/2343; H04N 21/4126; H04N 21/47205;
(Continued)

(56) References Cited

U.S. PATENT DOCUMENTS

2009/0187862 A1    7/2009    daCosta
2009/0217317 A1    8/2009    White
(Continued)

FOREIGN PATENT DOCUMENTS

CN         101583002      11/2009
CN         104904230       9/2015
WO      WO 2013095416      6/2013

OTHER PUBLICATIONS

Constantine, J., "Facebook Unleashes VR-Style 360 Videos for Ads and IOS", last accessed May 29, 2019, pp. 1-4, available at: https://techcrunch.com/2015/11/12/vmarketing/.
(Continued)

*Primary Examiner* — Mulugeta Mengesha
(74) *Attorney, Agent, or Firm* — Kilpatrick Townsend & Stockton LLP

(57) ABSTRACT

Methods, systems, and media for interacting with content using a second screen device are provided. In some implementations, the method comprises: receiving, from a remote media streaming device, a request to present media content items; sending, over the Internet, interactive content to the media streaming device as a stream of video; causing the interactive content to be presented by the media streaming device; causing a notification to be sent to a computing device associated with the media streaming device indicating that the content being presented by the media streaming device is interactive content; receiving instructions from the computing device to control how an object depicted in the interactive content is presented; updating the interactive content based on the instructions; sending the updated interactive content to the media streaming device as a stream of video; and causing the updated interactive content to be presented by the media streaming device.

18 Claims, 7 Drawing Sheets

Related U.S. Application Data continuation of application No. 16/166,693, filed on Oct. 22, 2018, now Pat. No. 10,448,118, which is a continuation of application No. 15/132,908, filed on Apr. 19, 2016, now Pat. No. 10,110,968.

(51) Int. Cl.

| | |
|---|---|
| *G06F 16/438* | (2019.01) |
| *G06F 16/9535* | (2019.01) |
| *G09G 5/12* | (2006.01) |
| *H04L 65/612* | (2022.01) |
| *H04N 21/00* | (2011.01) |
| *H04N 21/2343* | (2011.01) |
| *H04N 21/41* | (2011.01) |
| *H04N 21/472* | (2011.01) |
| *H04N 21/488* | (2011.01) |
| *H04N 21/61* | (2011.01) |
| *H04N 21/81* | (2011.01) |
| *H04N 21/8545* | (2011.01) |

(52) U.S. Cl.
CPC ........... *G06F 16/9535* (2019.01); *G09G 5/12* (2013.01); *H04L 65/612* (2022.05); *H04N 21/00* (2013.01); *H04N 21/2343* (2013.01); *H04N 21/41265* (2020.08); *H04N 21/47205* (2013.01); *H04N 21/4882* (2013.01); *H04N 21/6125* (2013.01); *H04N 21/812* (2013.01); *H04N 21/8186* (2013.01); *H04N 21/8545* (2013.01); *G09G 2370/02* (2013.01)

(58) Field of Classification Search
CPC ........... H04N 21/4882; H04N 21/6125; H04N 21/812; H04N 21/8186; H04N 21/8545
See application file for complete search history.

(56) References Cited

U.S. PATENT DOCUMENTS

| | | | |
|---|---|---|---|
| 2009/0327894 A1 | 12/2009 | Rakib et al. | |
| 2010/0107193 A1 | 4/2010 | Manthoulis et al. | |
| 2011/0067069 A1 | 3/2011 | Karaoguz et al. | |
| 2011/0078634 A1 | 3/2011 | Klappert et al. | |
| 2013/0262997 A1* | 10/2013 | Markworth | H04N 21/4828 715/716 |
| 2013/0347018 A1* | 12/2013 | Limp | H04N 21/4394 725/19 |
| 2014/0028921 A1* | 1/2014 | Moon | H04N 21/4725 348/734 |
| 2014/0229994 A1* | 8/2014 | Fell | H04N 21/435 725/54 |
| 2014/0245335 A1 | 8/2014 | Holden et al. | |
| 2014/0282653 A1* | 9/2014 | Ariantaj | H04N 21/8545 725/14 |
| 2014/0282677 A1 | 9/2014 | Mantell et al. | |

OTHER PUBLICATIONS

DoubleClick, "Spinnaker Unleashes The Amazing Spider-Man Using Channel Connect, the Unique Media-Bridging Technology from DoubleClick Rich Media", Case Study, Aug. 31, 2012, pp. 1-2.
Examination Report dated Nov. 23, 2020 in EP Patent Application No. 16822820.3.
Google Ads, "AdWords Dynamic Remarketing Ads", YouTube Video, last updated Oct. 2, 2014, pp. 1, available at: https://www.youtube.com/watch?v=Qk_083GMcQU&feature=youtu.be&t=18.
International Search Report and Written Opinion dated Mar. 16, 2017 in International Patent Application No. PCT/US2016/065365.
Katzakis, N. and Hori, M., "Mobile Phones as 3-DOF Controllers: A Comparative Study", In Proceedings of the 8th IEEE International Conference on Dependable, Automatic and Secure Computing, Chengdu, CN, Dec. 12-14, 2009, pp. 1-5.
Kim, J., et al., "Design and Implementation for Interative Augmented Broadcasting System", In IEEE Transactions on Broadcasting, vol. 60, No. 2, Jun. 2014, pp. 217-226.
Notice of Allowance dated May 30, 2019 in U.S. Appl. No. 16/166,693.
Notice of Allowance dated Jun. 20, 2018 in U.S. Appl. No. 15/132,908.
Notice of Allowance dated Sep. 10, 2021 in U.S. Appl. No. 16/600,902.
Office Action dated Jan. 18, 2017 in U.S. Appl. No. 15/132,908.
Office Action dated Feb. 2, 2018 in U.S. Appl. No. 15/132,908.
Office Action dated Feb. 14, 2019 in U.S. Appl. No. 16/166,693.
Office Action dated Mar. 25, 2021 in CN Patent Application No. 201680078757.X.
Office Action dated May 12, 2017 in U.S. Appl. No. 15/132,908.
Office Action dated Jul. 22, 2020 in U.S. Appl. No. 16/600,902.
Office Action dated Oct. 6, 2017 in U.S. Appl. No. 15/132,908.
Office Action dated Dec. 2, 2020 in U.S. Appl. No. 16/600,902.
Summons to Attend Oral Proceedings dated Jan. 17, 2022 in EP Patent Application No. 16822820.3.

\* cited by examiner

METHODS, SYSTEMS AND MEDIA FOR INTERACTING WITH CONTENT USING A SECOND SCREEN DEVICE

CROSS-REFERENCE TO RELATED APPLICATIONS

This application is a continuation of U.S. patent application Ser. No. 16/600,902, filed Oct. 14, 2019, which is a continuation of U.S. patent application Ser. No. 16/166,693, filed Oct. 22, 2018, which is a continuation of U.S. patent application Ser. No. 15/132,908, filed Apr. 19, 2016, each of which is hereby incorporated by reference herein in its entirety.

TECHNICAL FIELD

Methods, systems and media for interacting with content using a second screen device are provided.

BACKGROUND

Streaming media devices are often used to present streaming media content on a television, such as movies, user generated videos, etc. This content is often limited to non-interactive content, and devices that stream interactive content, such as gaming devices, require a dedicated device for interacting with the game. However, it would be desirable to be able to provide interactive content in connection with non-interactive content such as movies or videos that a user could control through a device such as a smartphone.

Accordingly, methods, systems and media for interacting with content using a second screen device are provided.

SUMMARY

In accordance with some implementations of the disclosed subject matter, mechanisms for interacting with content using a second screen device are provided.

In accordance with some implementations of the disclosed subject matter, a method for interacting with content using a second screen device is provided, the method comprising: receiving, from a remote media streaming device, a request to present one or more media content items; sending, over the Internet, interactive content to the media streaming device as a stream of video based on the request to present the one or more media content items; causing the interactive content to be presented by the media streaming device; causing a notification to be sent to a computing device associated with the media streaming device indicating that the content being presented by the media streaming device is interactive content; receiving instructions from the computing device to control how an object depicted in the interactive content is presented; updating the interactive content based on the instructions; sending the updated interactive content to the media streaming device as a stream of video; and causing the updated interactive content to be presented by the media streaming device.

In accordance with some implementations of the disclosed subject matter, a system for interacting with content using a second screen device is provided, the system comprising: a hardware processor that is programmed to: receive, from a remote media streaming device, a request to present one or more media content items; send, over the Internet, interactive content to the media streaming device as a stream of video based on the request to present the one or more media content items; cause the interactive content to be presented by the media streaming device; cause a notification to be sent to a computing device associated with the media streaming device indicating that the content being presented by the media streaming device is interactive content; receive instructions from the computing device to control how an object depicted in the interactive content is presented; update the interactive content based on the instructions; send the updated interactive content to the media streaming device as a stream of video; and cause the updated interactive content to be presented by the media streaming device.

In accordance with some implementations of the disclosed subject matter, a non-transitory computer-readable medium containing computer executable instructions that, when executed by a processor, cause the processor to perform a method for interacting with content using a second screen device is provided, the method comprising: receiving, from a remote media streaming device, a request to present one or more media content items; sending, over the Internet, interactive content to the media streaming device as a stream of video based on the request to present the one or more media content items; causing the interactive content to be presented by the media streaming device; causing a notification to be sent to a computing device associated with the media streaming device indicating that the content being presented by the media streaming device is interactive content; receiving instructions from the computing device to control how an object depicted in the interactive content is presented; updating the interactive content based on the instructions; sending the updated interactive content to the media streaming device as a stream of video; and causing the updated interactive content to be presented by the media streaming device.

In accordance with some implementations of the disclosed subject. a system for interacting with content using a second screen device is provided, the system comprising: means for receiving, from a remote media streaming device, a request to present one or more media content items; means for sending, over the Internet, interactive content to the media streaming device as a stream of video based on the request to present the one or more media content items; means for causing the interactive content to be presented by the media streaming device; means for causing a notification to be sent to a computing device associated with the media streaming device indicating that the content being presented by the media streaming device is interactive content; means for receiving instructions from the computing device to control how an object depicted in the interactive content is presented; means for updating the interactive content based on the instructions; means for sending the updated interactive content to the media streaming device as a stream of video; and means for causing the updated interactive content to be presented by the media streaming device.

In some implementations, the computing device caused the media streaming device to request the one or more content items.

In some implementations, the request to present one or more media content items is associated with an application installed on the computing device, and wherein the notification is associated with the application.

In some implementations, the instructions include an instruction to rotate the object.

In some implementations, the interactive content does not correspond to any of the one or more media content items.

In some implementations, the interactive content is an advertisement.

BRIEF DESCRIPTION OF THE DRAWINGS

Various objects, features, and advantages of the disclosed subject matter can be more fully appreciated with reference to the following detailed description of the disclosed subject matter when considered in connection with the following drawings, in which like reference numerals identify like elements.

DETAILED DESCRIPTION

In accordance with some implementations of the disclosed subject matter, mechanisms (which can include methods, systems and media) for interacting with content using a second screen device are provided.

In some implementations, the mechanisms described herein can facilitate interaction with interactive content presented by a media receiving device using a second screen device. In some implementations, the mechanisms described herein can send a notification to a second screen device when the media receiving device is presenting interactive content associated with a media item to be presented by the media receiving device. For example, when the media receiving device is presenting an interactive advertisement prior to presenting a video selected by a user using a smartphone, the mechanisms described herein can send a push notification to the smartphone alerting the user to the interactivity of the content.

In some implementations, the second screen device can begin providing instructions for controlling the interactive content after the second screen device detects that a particular action or series of actions have been performed. For example, when the smartphone receives the notification, the smartphone can detect that the user has picked up the smartphone and can begin providing instructions to control the interactive advertisement.

In some implementations, the mechanisms described herein can provide updated interactive content based on the instructions received from the second screen device. For example, in response to the smartphone detecting a particular movement, such as a rotation of the smartphone, the smartphone can provide instructions to a server that generated the interactive content to rotate a product shown in the advertisement. In such an example, the server can receive the instruction to rotate the product, and can update the video being streamed to the media receiving device to reflect the instruction received from the smartphone.

Figure 1A:
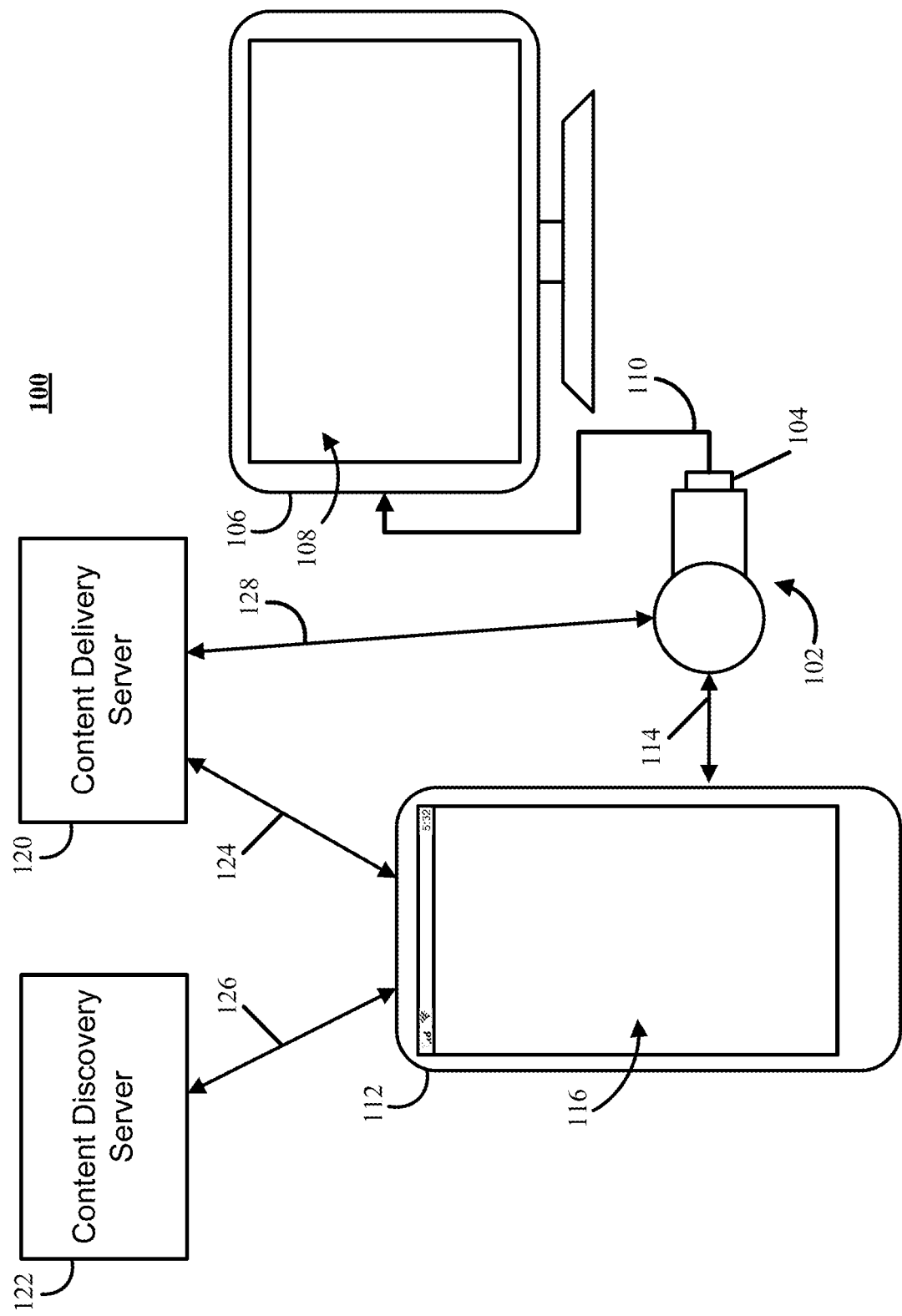
FIGS. 1A and 1B show examples of systems for interacting with content using a second screen device in accordance with some implementations of the disclosed subject matter.

Turning to FIG. 1A, an example 100 of a system for interacting with content using a second screen device is shown in accordance with some implementations of the disclosed subject matter. In some implementations, system 100 can include a media streaming device 102, which can include an input/output connector 104. Input/output connector 104 can be any suitable input and/or output connector for communicating with a media playback device 106. For example, input/output connector 104 can be a High-Definition Multimedia Interface (HDMI) port, a Universal Serial Bus (USB) connector (e.g., a USB 3.0 connector), a THUNDERBOLT connector, a Digital Visual Interface (DVI) connector, a TOSLINK connector (e.g., a fiber optic audio connector), a Separate Video (S-Video) Connector, any other suitable connector and/or any suitable combination of connectors.

In some implementations, media playback device 106 can be a display device that includes hardware and/or software for presenting media received from one or more sources of media content. For example, media playback device 106 can include a television, a smart television, a monitor, a set-top box, an audio video (AV) receiver, any other suitable media playback device and/or any suitable combination thereof. More particularly, media playback device 106 can include a display 108, speakers, hardware and/or software for rendering media content such as analog and/or digital video and/or audio data, a power supply, etc. Media playback device 106 can include various input ports for receiving video and/or audio data from various sources. Such input ports can include one or more HDMI ports, one or more component video ports, one or more composite video ports, one or more USB ports, one or more S-Video ports, one or more TOSLINK ports, one or more coaxial ports, one or more Ethernet ports (whether wired or wireless), etc.

In some implementations, media streaming device 102 can be connected to media playback device 106 by a connection 110. Media streaming device 102 and media playback device 106 can be connected using any suitable technique(s). For example, connection 110 can include a plug of input/output connector 104 of media streaming device 102 inserted in a corresponding receptacle port of media playback device 106. As another example, a suitable cable, such as an HDMI cable, can be connected between input/output connector 104 and a port of media playback device 106. Additionally or alternatively, media streaming device 102 can be included as hardware and/or software of media playback device 106.

In some implementations, media streaming device 102 can be coupled to a computing device 112 using a communications link 114. Computing device 112 can be any suitable computing device, such as a smartphone, a tablet computer, a wearable computer, a laptop computer, a personal computer, an electronic reader, a digital media receiver, a smart television, a game console, any other suitable computing device, or any suitable combination thereof. In some implementations, communications link 114 can include any suitable communications link, for example, as described below in connection with FIG. 2. Additionally, communications link 114 can include a network, such as a local area network (LAN) having wired and/or wireless connections. Additionally or alternatively, communications link 114 can include a wireless connection between computing device 112 and media streaming device 102, such as an ad hoc wireless network connection, a short-range wireless communication protocol (e.g., Bluetooth, Bluetooth Low Energy, Wireless USB, etc.). In some implementations, communications between computing device 112 and media streaming device 102 over communications link 114 can be encrypted using any suitable encryption technique(s). For example, messages sent from computing device 112 to media streaming device 114 can be encrypted using any suitable encryption scheme, for example, using a public key-private key pair for encryption and decryption of messages. As another example, communications over communications link 114 can be encrypted using Transport Layer Security (TLS).

In some implementations, computing device 112 can include a display 116 for presenting a user interface to a user. In some examples described herein, computing device 112 can be a mobile computing device such as a smartphone or a tablet computer, and display 116 can include a touchscreen for receiving input and displaying a user interface and/or media content to a user. Additionally, as described below in connection with FIG. 3, computing device 112 can include any suitable sensors, such as accelerometers, gyroscopes, electronic compasses, etc.

In some implementations, computing device 112 can communicate with a content discovery server 122 over a communications link 126. Computing device 112 can communicate with content discovery server 122 to discover and/or browse content made available by a content delivery server 120. For example, a user can use computing device 112 to find media content to be presented by interacting with content discovery server 122. In some implementations, such media content can be presented using display 116 of computing device 112. In some implementations, computing device 112 can present a media content item that was selected using content discovery server 122, by requesting the media content item from content delivery server 120 and receiving the media content item over a communications link 124. In some implementations, each of content delivery server 120 and/or content discovery server 122 can be implemented on any suitable number of servers. Additionally or alternatively, in some implementations, the functions performed by content delivery server 120 and content discovery server 122 can be performed by the same device (e.g., by a common server computer). In some implementations, multiple content delivery servers can provide content to computing device 112 in response to a request for content. For example, in response to a request for a particular media content item from computing device 112, content delivery server 120 can cause an advertisement to be provided to computing device 112 prior to, during and/or after the requested content item is presented. In such an example, the server that provides the advertisement can be separate from the server that provides the requested media content item.

In some implementations, communications links 124 and/or 126 can include a local area network (e.g., a home network) and/or a non-local network (e.g., the Internet). For example, computing device 112 can be connected to a common LAN such as a home network, and can connect to content discovery server 122 and/or content delivery server 120 through the Internet. As another example, content delivery server 120 and/or content discovery server 122 can be connected to a LAN that is common to computing device 112. In a more particular example, content delivery server 120 and/or content discovery server 122 can be located remotely from computing device 112, and communications links 124 and/or 126 can include a non-local network such as the Internet for accessing content from content delivery server 120 and/or discovering content using content discovery server 122. In another more particular example, content delivery server 120 and/or content discovery server 122 can be located locally to computing device 112, and communications links 124 and/or 126 can include a local network, such as a home network, to which content delivery server 120 and/or content discovery server 122 are connected. In such an example, a non-local network of communications links 124 and/or 126 (if it exists) may not be used when accessing content from content delivery server 120 and/or discovering content using content discovery server 122.

In some implementations, a user of computing device 112 can cause media content made available by content delivery server 120 to be transmitted to media streaming device 102, which can, in turn, cause the media content to be presented on display 108 of media playback device 106 to which media streaming device 102 is connected. In some implementations, media streaming device 102 can receive power from media playback device 106 through connection 110, and may only be available to receive media content when power is being received over connection 110 (e.g., when a port to which media streaming device 102 is connected is selected as an active input port).

In some implementations, if a user has selected a media content item to be presented from content delivery server 120, the user can select an icon presented to the user in connection with the selected media content item to cause the media content item to be presented using media streaming device 102 and media playback device 106.

In some implementations, when a media content item is to be presented from content delivery server 120 using media streaming device 102, the media content item can be transmitted to media streaming device 102 over a communications link 128. Communications link 128 can include a local area network (e.g., a home network) and/or a non-local network (e.g., the Internet). For example, media streaming device 102 and computing device 112 can both be connected to a common LAN such as a home network, and can connect to content delivery server 120 through the Internet. As another example, content delivery server 120 can be connected to a LAN that is common to computing device 112 and/or media streaming device 102. In a more particular example, content delivery server 120 can be located remotely from media streaming device 102 and/or computing device 112, and communications link 128 can include a non-local network such as the Internet for accessing content from content delivery server 120. In another more particular example, content delivery server can be located locally to media streaming device 102 and/or computing device 112, and communications link 128 can include a local network, such as a home network, to which both media streaming device 102 and content delivery server 120 are connected. In such an example, a non-local network of communications link 128 (if it exists) may not be used when accessing content from content delivery server 120.

In some implementations, a user can choose a media content item to be presented using media streaming device 102 from a memory of computing device 112 (e.g., the user can choose a video that is stored locally on computing device 112). Additionally or alternatively, a user can choose a media content item to be presented using media streaming device 102 that is stored on another computing device present on the same local area network (e.g., network attached storage, a memory of a personal computer on a home network, memory on a server on the same network, etc.). Such a media content item stored on a computing device connected to a local area network can be transmitted from computing device 112 to media receiver 102 over communications link 114 (or any other suitable communications link), without being transmitted through content delivery server 120.

Figure 1B:
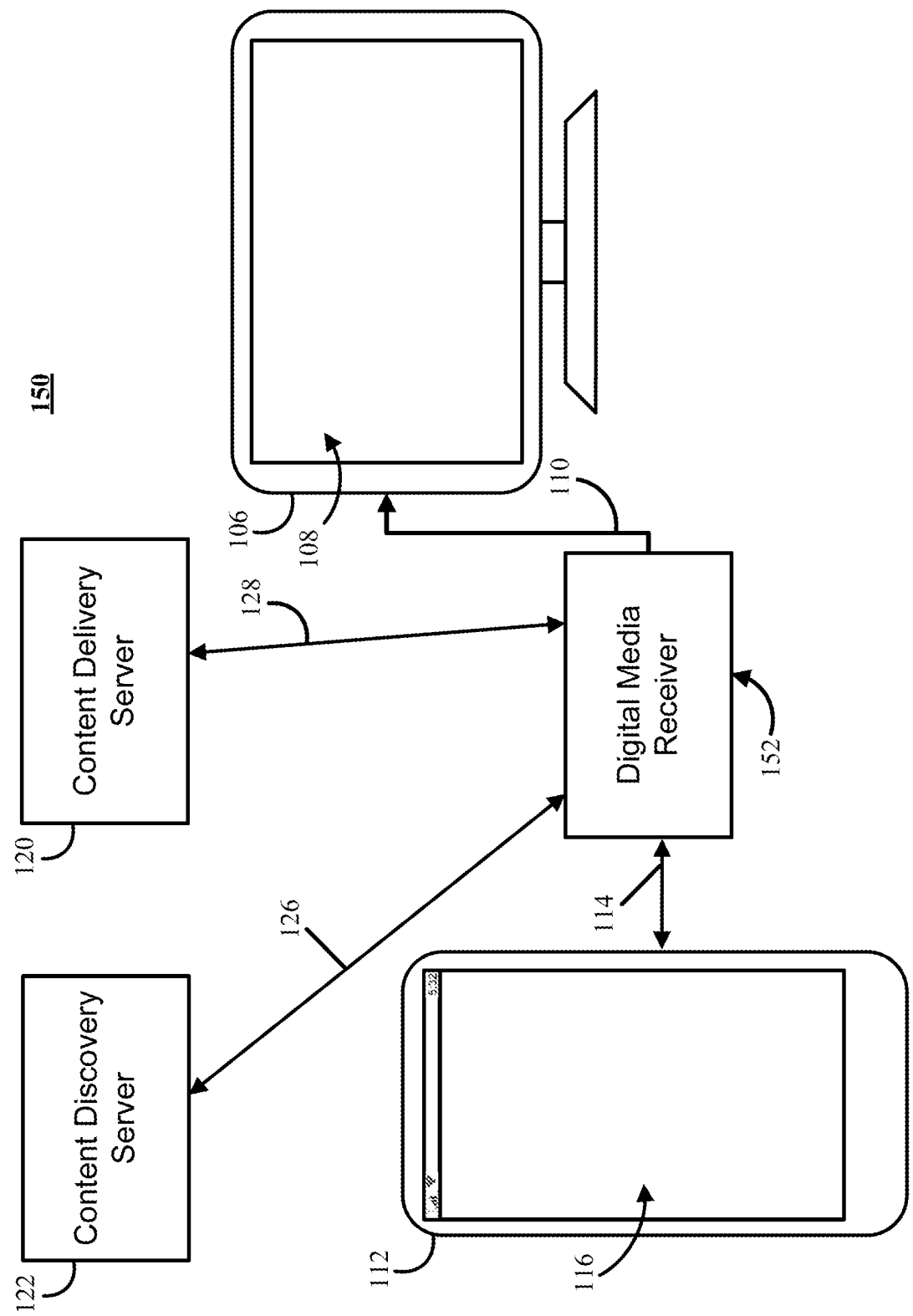

FIG. 1B shows an example 150 of another system for interacting with content using a second screen device in accordance with some implementations of the disclosed subject matter. In some implementations, system 150 can include a digital media receiver 152, which can be connected to media playback device 106 using any suitable input/output connector (e.g., as described above in connection with 104 and/or 110 of FIG. 1A). In some implementations, digital media receiver 152 can be coupled to computing device 112 using a communications link 114 (e.g., as described above in connection with media streaming device 102 and computing device 112 of FIG. 1A). Additionally, in some implementations, digital media receiver 152 can communicate with content delivery server 120 and/or content discovery server 122 over communications links 128 and/or 126, respectively (e.g., as described above in connection with computing device 12 of FIG. 1). In such implementations, digital media receiver 152 can be used to browser for content based on instructions received from computing device 112 and/or any other suitable device (e.g., such as a remote control associated with media streaming device 152) to control a user interface presented by digital media receiver 152 using media playback device 106.

In some implementations, one or more items of media content can be selected for presentation using computing device 112 (e.g., as described above in connection with FIG. 1A), and computing device 112 can communicate the selection to digital media receiver 152 and/or content delivery server 120 to be pushed to digital media receiver 152.

Figure 2:
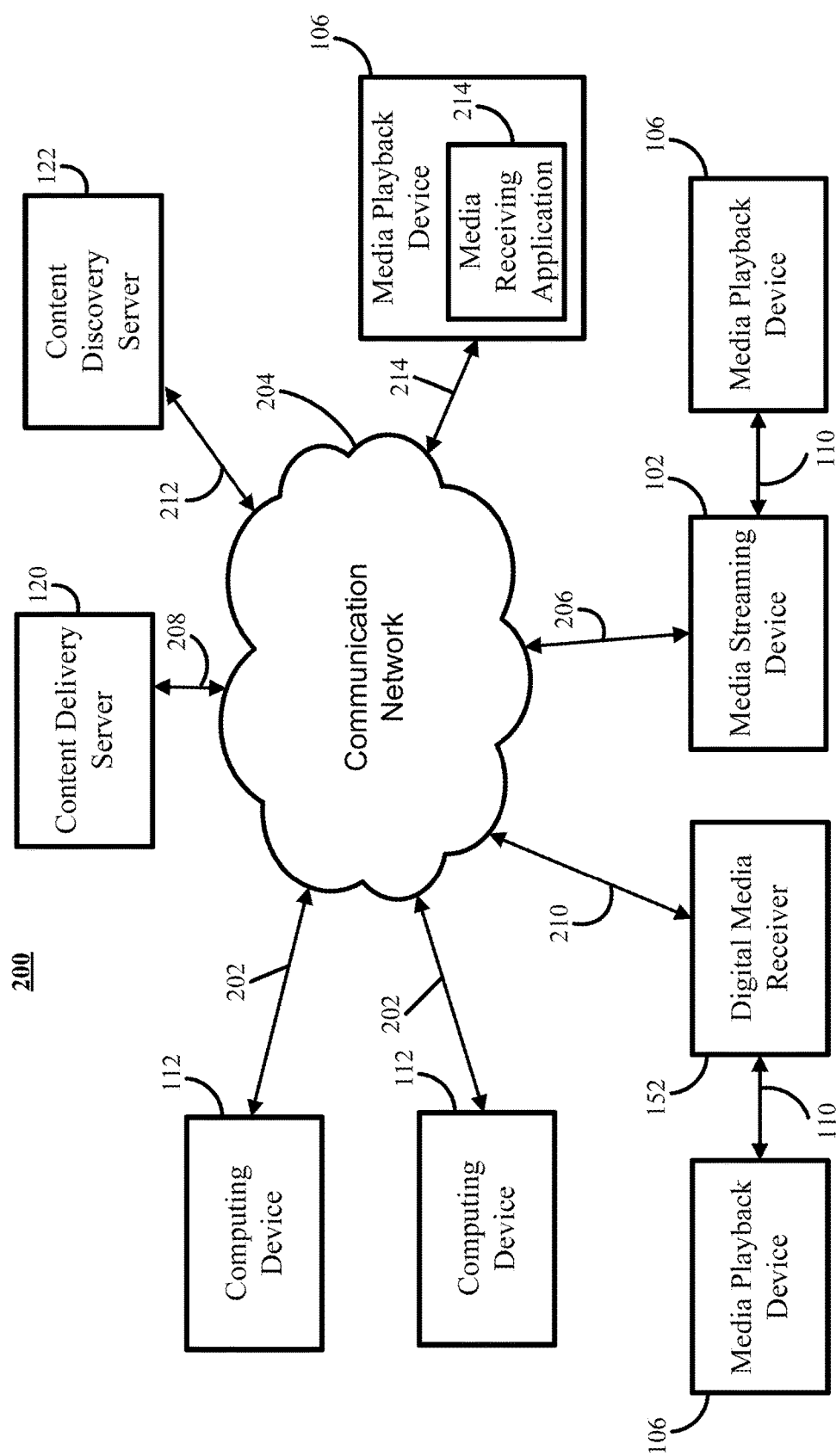
FIG. 2 shows an example of a generalized schematic diagram of a system on which the mechanisms for interacting with content using a second screen device as described herein can be implemented in accordance with some implementations of the disclosed subject matter.

FIG. 2 shows an example 200 of a generalized schematic diagram of a system on which the mechanisms for interacting with content using a second screen device as described herein can be implemented in accordance with some implementations of the disclosed subject matter. As illustrated, system 200 can include one or more computing devices 112. Computing devices 112 can be local to each other or remote from each other. Computing devices 112 can be connected by one or more communications links 202 to a communications network 204 that can be linked via a communications link 206 to media streaming device(s) 102, via a communications link 208 to content delivery server 120, via a communications link 210 to digital media receiver 152, via a communications link 212 to content discovery server 122, via communications links 202 to other computing devices 112, and via communications link 210 to remote control 130.

In some implementations, each of the computing devices 112, content delivery server 120, content discovery server 122, media streaming device 102, and digital media receiver 152 can be any of a general purpose device such as a computer or a special purpose device such as a client, a server, etc. Any of these general or special purpose devices can include any suitable components such as a hardware processor (which can be a microprocessor, digital signal processor, a controller, etc.), memory, communication interfaces, display controllers, input devices, etc. For example, computing device 112 can be implemented as a smartphone, a tablet computer, a wearable computer, a personal computer, a laptop computer, a gaming console, a digital media receiver, a set-top box, a smart television, a server, etc.

Communications network 204 can be any suitable computer network or combination of such networks including the Internet, an intranet, a wide-area network (WAN), a local-area network (LAN), a wireless network, a digital subscriber line (DSL) network, a frame relay network, an asynchronous transfer mode (ATM) network, a virtual private network (VPN), etc. Communications links 202, 206, 208, and 212 can be any communications links suitable for communicating data among computing devices 112, media streaming device 102, content delivery server 120, content discovery server 122, and remote control 130, such as network links, dial-up links, wireless links, hard-wired links, any other suitable communications links, or any suitable combination of such links. Computing devices 112 can discover, browse, download, stream, store, playback, transmit, and/or otherwise present content stored locally at computing device 112 and/or stored remotely at content delivery server 120 using any suitable technique(s).

System 200 can include media streaming device 102 as described above in connection with FIG. 1A and/or digital media receiver 152 as described above in connection with FIG. 1B, and can include a media receiving application 214 installed on and/or executed by on one or more of media playback devices 106, which can replicate the functions of media streaming device 102 and/or digital media receiver 152.

System 200 can include one or more content delivery servers 120. Content delivery server 120 can be any suitable server for providing access to media content items in accordance with the mechanisms described herein, such as a processor, a computer, a data processing device, and/or any suitable combination of such devices.

System 200 can include one or more content discovery servers 122. Content discovery server 122 can be any suitable server for facilitating discovery and/or browsing of media content items accessible on content delivery server 120 in accordance with the mechanisms described herein, such as a processor, a computer, a data processing device, and/or any suitable combination of such devices.

In some implementations, communications link 114 described above in connection with FIG. 1 can include communications link 202, communication network 204, and communications link 206; communications link 124 described above in connection with FIG. 1 can include communications link 202, communication network 204, and communications link 208; communications link 126 described above in connection with FIG. 1 can include communications link 202, communication network 204, and communications link 212; communications link 128 described above in connection with FIG. 1 can include communications link 206, communication network 204, and communications link 208; and communications link 132 described above in connection with FIG. 1 can include communications link 202, communications network 204 and communications link 210.

Figure 3:
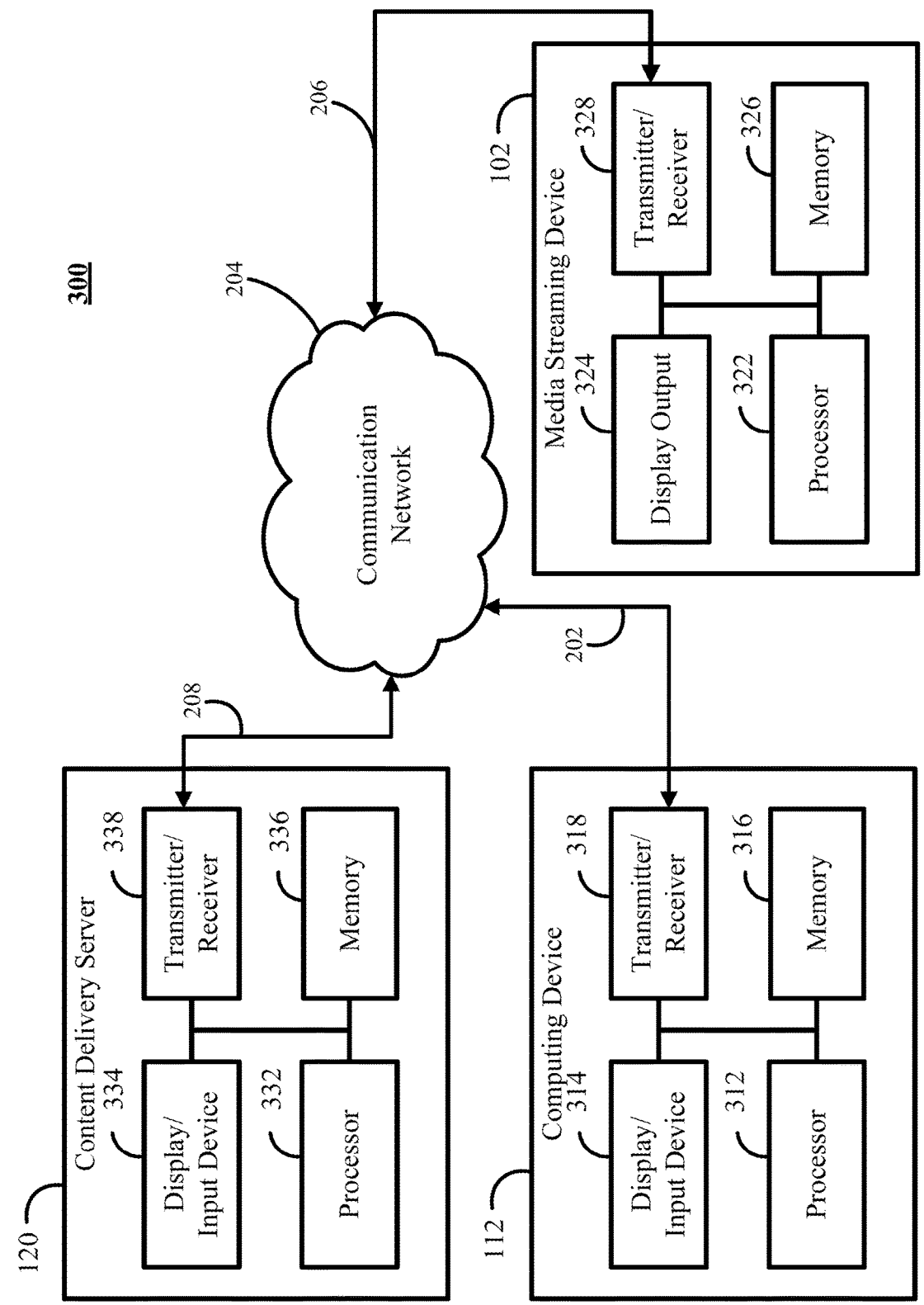
FIG. 3 shows an example of hardware that can be used to implement one of the computing devices, one of the media streaming devices, and the content delivery server depicted in FIG. 2 in accordance with some implementations of the disclosed subject matter.

FIG. 3 shows an example 300 of hardware that can be used to implement one of computing devices 112, media streaming device 102, and content delivery server 120 depicted in FIG. 2 in accordance with some implementations of the disclosed subject matter. Referring to FIG. 3, computing device 112 can include a hardware processor 312, a display/input device 314, memory 316, and a transmitter/receiver 318, which can be interconnected. In some implementations, memory 316 can include a storage device (such as a non-transitory computer-readable medium) for storing a computer program for controlling hardware processor 312.

Hardware processor 312 can use the computer program to present on display/input device 314 media content and/or an interface that allows a user to, among other things, cause media content presented on display/input device 314 to be presented on a media receiving device, such as media streaming device 102. It should also be noted that data received through communications link 202, and/or any other communications links can be received from any suitable source. In some implementations, hardware processor 312 can send and receive data through communications link 202, communications link 132, and/or any other communications links using, for example, a transmitter, receiver, transmitter/receiver, transceiver, or any other suitable communication device, such as transmitter/receiver 318. Display/input device 314 can include a touchscreen, a flat panel display, a cathode ray tube display, a projector, a speaker(s), and/or any other suitable display and/or presentation devices, and can further include a computer keyboard, a computer mouse, a microphone, a touchpad, a voice recognition circuit, a touch interface of a touchscreen, and/or any other suitable input device. Additionally, in some implementations, display/input device 314 can include sensors that detect movement of computing device, such as one or more accelerometers that can detect translation of computing device 112, one or more gyroscopes that can detect rotation of computing device 112 around one or more axes, and/or any other suitable sensors that can detect any suitable movement of computing device 112. Transmitter/receiver 318 can include any suitable transmitter and/or receiver for transmitting and/or receiving, among other things, media content including audio and/or video content.

Media streaming device 102 can include a hardware processor 322, a display output 324, memory 326, and a transmitter/receiver 328, which can be interconnected. In some implementations, memory 326 can include a storage device (such as a non-transitory computer-readable medium) for storing a computer program for controlling hardware processor 322.

Hardware processor 322 can use the computer program to provide media content and/or a user interface to display output 324 for presenting the media content and/or user interface on a media playback device. It should also be noted that data received through communications link 206 or any other communications links can be received from any suitable source. In some implementations, hardware processor 322 can send and receive data through communications link 206 or any other communications links using, for example, a transmitter, receiver, transmitter/receiver, transceiver, or any other suitable communication device, such as transmitter/receiver 328. Display output 324 can include hardware, software and/or firmware for outputting media content and/or a user interface to a media playback device (e.g., media playback device 106) in any suitable format, and can include input/output connector 104 as described above in connection with FIG. 1. Transmitter/receiver 328 can include any suitable transmitter and/or receiver for transmitting and/or receiving, among other things, media content including audio and/or video content. In some implementations, digital media receiver 152 can be implemented using similar hardware to media streaming device 102, but can include more or different programming and/or a upgraded hardware from content delivery server media streaming device.

Content delivery server 120 can include a hardware processor 332, a display/input device 334, memory 336, and a transmitter/receiver 338, which can be interconnected. In some implementations, memory 336 can include a storage device (such as a non-transitory computer-readable medium) for storing a server program for controlling hardware processor 332.

Hardware processor 332 can use the server program to communicate with computing device 112 and/or media streaming device 102, as well as provide access to media content. It should also be noted that data received through communications link 208 or any other communications links can be received from any suitable source. In some implementations, hardware processor 332 can send and receive data through communications link 208 or any other communication links using, for example, a transmitter, receiver, transmitter/receiver, transceiver, or any other suitable communication device, such as transmitter/receiver 338. In some implementations, hardware processor 332 can receive commands and/or values transmitted by one or more users. Display/input device 334 can include a touchscreen, a flat panel display, a cathode ray tube display, a projector, a speaker(s), and/or any other suitable display and/or presentation devices, and can further include a computer keyboard, a computer mouse, a microphone, a touchpad, a voice recognition circuit, a touch interface of a touchscreen, and/or any other suitable input device. Transmitter/receiver 318 can include any suitable transmitter and/or receiver for transmitting and/or receiving, among other things, media content including audio and/or video content.

In some implementations, content delivery server 120 can be implemented in one servers or can be distributed as any suitable number of servers. For example, multiple servers 120 can be implemented in various locations to increase reliability and/or increase the speed at which server 120 can communicate with computing devices 112 and/or media receiving device 102.

In some implementations, content discovery server 122 can be implemented using similar hardware to content delivery server 120, but can include a server program for facilitating discovery and/or browsing of media content items accessible from content delivery server 120.

Figure 4:
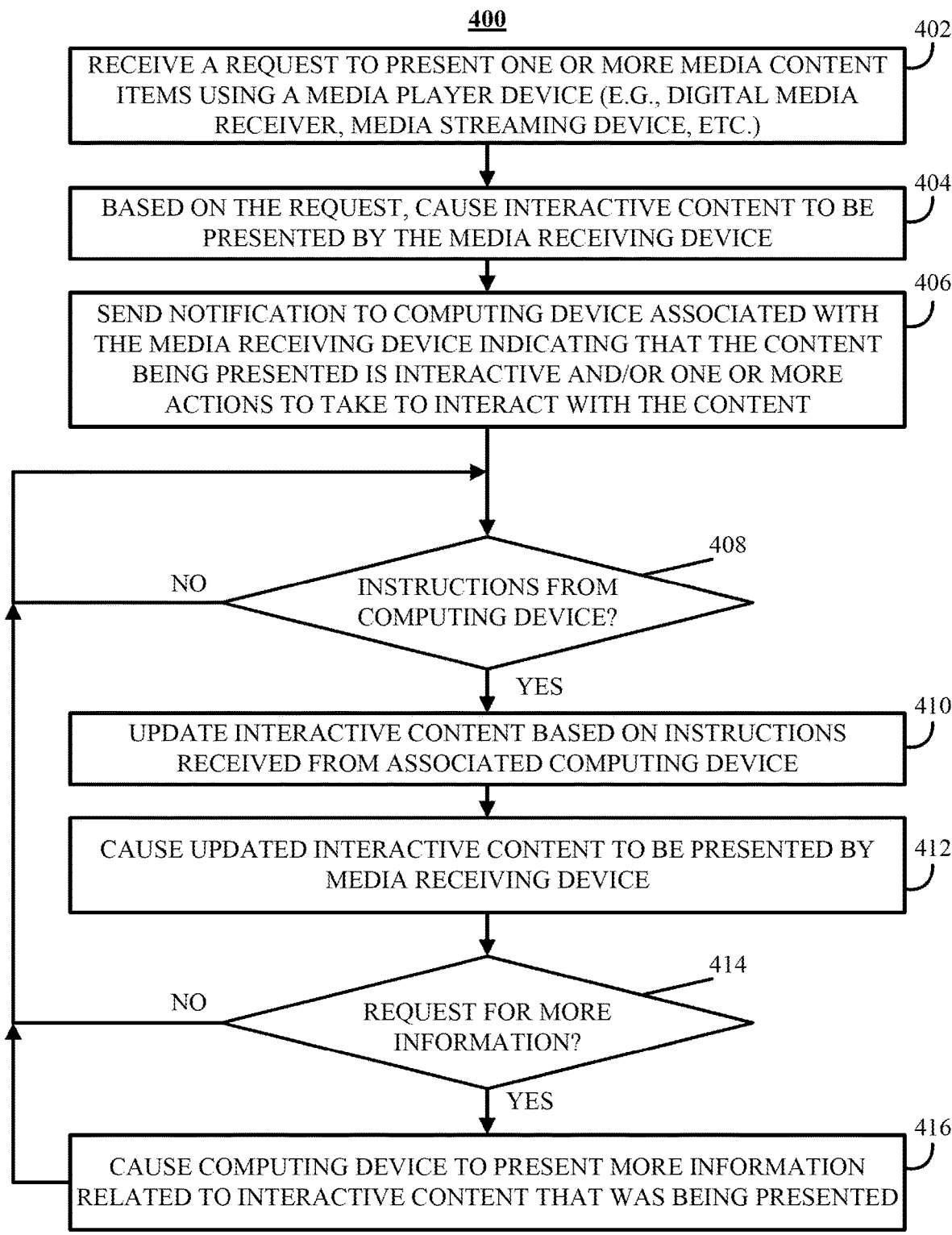
FIG. 4 shows an example of a process for interacting with content using a second screen device in accordance with some implementations of the disclosed subject matter.

FIG. 4 shows an example 400 of a process for interacting with content using a second screen device in accordance with some implementations of the disclosed subject matter. At 402, process 400 can receive a request to present one or more media content items using a media receiving device (e.g., media streaming device 102, digital media receiver 152, etc.). In some implementations, the request can be received from any suitable device. For example, as described above in connection with system 100 of FIG. 1A, computing device 112 can communicate identifying information, such as a uniform resource locator (URL), of the one or more media content items and their source to media streaming device 102, which can request the one or more media content items (e.g., from content delivery server 120). As another example, as described above in connection with system 150 of FIG. 1B, digital media receiver 152 can request one or more media content items (e.g., from content delivery server 120) and/or computing device 112 can request one or more media content items be presented using digital media receiver 152 (e.g., by sending the request and identifying information of digital media receiver 152 to content deliver server 120).

In some implementations, the request can include any suitable information and can be for any suitable media content items. For example, the request can include identifying information of the one or more content items such as a URL, a content identification number or other sequence of characters, one or more search terms, one or more characteristics of the content that is being requested (e.g., genre, artist, etc.), etc. As another example, the request can be a request for a particular media content item, one or more media content items responsive to a search, a stream of media content items corresponding to one or more artists, genres, etc.

In some implementations, the requested media content can include any suitable media content such as video, audio, one or more images, one or more items of interactive content, any other suitable media content, or any suitable combination thereof.

In some implementations, computing device 112 can be used to browse for content and/or to communicate with media streaming device 102 and/or digital media receiver 152 using one or more applications and/or using the operating system of computing device 112. For example, in some implementations, a user can browse for content using a particular application installed on and/or being executed by computing device 112. In such an example, when the user finds a media content item (or multiple media content items, such as a playlist) that they wish to consume, the user can provide input to computing device 112 to request the content through the application being used to browse for the content. Computing device 112 can request the content for presentation by computing device 112, can cause media streaming device 102 to request the content, can cause digital media receiver 152 to request the content and/or can cause the content to be sent to digital media receiver 152. In some implementations, the application on computing device 112 used to browse for content and the application used to present content can be different applications. In some implementations, during presentation of the content by computing device 112, a user can provide input to cause the content to be presented by media streaming device 102 and/or digital media receiver 152. Such input can be provided in association with a particular application that is being used by computing device 112 to present the content and/or through the operating system of computing device 112.

In some implementations, computing device 112 can be used to control operation of media streaming device 102 and/or digital media receiver 152 through one or more applications. In such implementations, the application used to control operation of media streaming device 102 and/or digital media receiver 152 can be the same or different than the application described above for presenting content using computing device 112.

At 404, process 400 can cause interactive content to be presented by the media receiving device based on the request for one or more media content items. In some implementations, the interactive content can be included in the requested one or more media content items. Additionally or alternatively, in some implementations, the interactive content can be an advertisement that is being presented based on the request (e.g., as a pre-roll advertisement, an interstitial advertisement, a post-roll advertisement, etc.). For example, in response to the request for one or more content items, content delivery server 120 can provide an advertisement that includes interactive content. As another example, in response to the request for one or more content items, content delivery server 120 can cause an advertisement to be provided to content delivery server 120 and/or the media receiving device from an advertisement server (which can be implemented using any suitable components).

In some embodiments, the interactive content can include any suitable elements at least one of which can be manipulated. For example, in some implementations, the interactive content can be at least a portion of an advertisement that includes a representation of at least one product or service that is being advertised. In such an example, through instructions provided from an associated computing device (e.g., computing device 112), the representation can be manipulated by the user to provide an interactive experience. In a more particular example, the interactive content can include a model of a product that the user can manipulate to show from different angles, different magnifications, etc. In another more particular example, the interactive content can include models of multiple products (e.g., versions of a product) that are available, and the user can select a model and manipulate that model to show it from different angles, different magnifications, etc. As yet another more particular example, the interactive content can include a representation of an environment through which the user can navigate by providing instructions through computing device 112. In such an example, the interactive content can provide an interactive tour through a resort, golf course, etc.

As another example, in some implementations, the interactive content can be provided as at least a portion of the requested one or more media content items. In a more particular example, the interactive content can be provided in connection with a video to facilitate a user exploring an object or place depicted in the video in more detail. In another more particular example, in a video that reviews a particular product, a model of the product can be provided as interactive content which the user can manipulate through instructions from user device 112.

At 406, in response to the interactive content being presented, process 400 can send a notification to a computing device associated with the media receiving device for which the request for content was received. In some implementations, the notification can indicate that the content that is currently being presented by the media receiving device is interactive content that can be manipulated by using computing device 112. In some implementations, the notification can be provided to computing device using any suitable technique or combination of techniques. For example, process 400 can cause a push notification to be sent to computing device 112. In such an example, the push notification can be associated with a particular application, such as the application used to request the content item from computing device 112, and/or an application that can be used to control operation of media streaming device 102 and/or digital media receiver 152. In some implementations, the notification can be provided using haptic feedback (e.g., vibration) having any suitable pattern, audio having any suitable pattern, text, images, any other suitable content, or any suitable combination thereof.

In some implementations, the notification can include any suitable instructions for the user to follow in order to begin manipulating the interactive content. For example, the notification can include instructions to pick up computing device 112, move computing device 112 in a particular way and/or in a particular pattern, etc.

In some implementations, in addition to and/or in lieu of sending a notification to user device 112, other mechanisms can be used to initiate control of the interactive content by a particular computing device 112. For example, in some implementations, a QR code (and/or any other suitable machine readable code) can be presented with the content, and capturing an image of the QR code can cause computing device 112 to initiate control of the interactive content. As another example, an audio cue can be provided that can cause computing device 112 to perform one or more actions when the cue is detected by a microphone of computing device 112. As yet another example, in some implementations, the interactive content can include an indication that the content is interactive and that the user can initiate control of the interactive content by performing a particular action with computing device 112. In some implementations, multiple computing devices 112 can be sent notifications and/or can become associated with the interactive content. In such implementations, the computing devices can control different portions of the interactive content and/or be placed into a queue to wait for the opportunity to control the interactive content.

At 408, process 400 can determine whether instructions have been received from computing device 112 to manipulate the interactive content. In some implementations, the instructions for manipulating the interactive content can be determined by any computing device 112 based on input from one or more sensors. For example, computing device 112 can determine the instructions based on translation of computing device 112 detected by one or more accelerometers (and/or any other suitable sensor that can be used to detect translation of a computing device). As another example, computing device 112 can be determine the instructions based on rotation of computing device detected by one or more gyroscopes (and/or any other suitable sensor that can be used to detect rotation of a computing device). As yet another example, computing device 112 can determine the instructions based on input received by a touchscreen of computing device 112. As still another example, computing device 112 can determine the instructions based on the output of an image sensor, which can be used to sense relative motion (e.g., be calculating motion vectors between successive images). As a further example, computing device 112 can determine the instructions based on the output of a sensor that senses the position and/or configuration of a user's hand over a particular portion of computing device 112 without the user needing to touch a touchscreen of computing device 112.

In some implementations, process 400 can receive an indication of whether computing device 112 associated with the media receiving device is capable of providing instructions for manipulating the interactive content (e.g., whether computing device 112 has appropriate sensors to detect movement of user device 112 and/or touch inputs by a user). Additionally or alternatively, in some implementations, process 400 can receive an indication of whether computing device 112 is in a readily accessible state. For example, computing device 112 can send a signal indicating that computing device 112 is not readily accessible based on any suitable signals received by hardware processor 312. In a more particular example, a proximity sensor and/or light sensor of computing device 112 can indicate that a front surface of computing device 112 is blocked (e.g., because it is face down on a table, in a user's pocket, in a user's bag, etc.).

In some implementations, process 400 can determine whether to send a notification based on the capabilities of associated computing device 112 and/or the status of computing device 112. For example, if process 400 determines that computing device is not readily accessible (e.g., because it may be in the user's pocket or face down on a table), process 400 can determine that a notification is not to be sent and/or that interactive content is not appropriate for presentation.

In some implementations, computing device 112 can begin sending instructions to manipulate the interactive content after a suitable sensor input or combination of sensor outputs are detected. For example, computing device 112 can begin sending instructions to manipulate the interactive content after the notification is received and computing device 112 senses movement. As another example, computing device 112 can begin sending instructions to manipulate the interactive content after the notification is received and computing device 112 senses a particular combination of movements. In a more particular example, the notification can instruct the user to perform a particular action, such as a particular movement of computing device 112, a particular combination of movements of computing device 112, a particular user input to a touchscreen of computing device etc. In such an example, after such an action or combination of actions are performed, computing device can interpret further sensor outputs to generate instructions for manipulating the interactive content. In some implementations, computing device 112 can maintain a locked state while receiving sensor outputs, interpreting them, generating instructions for manipulating the interactive content and sending the instructions to a device (e.g., a server generating the interactive content, a media receiving device that received the interactive content, etc.).

In some implementations, computing device 112 can begin sending instructions to manipulate the interactive content after a particular application is opened, such as an application that was used to cause the content requested at 402 to be requested or an application that is used to control operation of the media receiving device.

In some implementations, computing device 112 and/or the interactive content can instruct a user to perform a certain action to calibrate and/or provide a reference point for computing device. For example, the user can be instructed to pick up computing device 112 (or move computing device 112 if the user is already holding computing device 112) and hold computing device 112 relatively still in a comfortable center position for a particular period of time (e.g., one half second, one second, etc.). Computing device 112 can set this point as a reference point, and provide instructions to manipulate the interactive content based on accelerations and/or rotations from this centered position. As another example, the user can be instructed to move computing device 112 in some particular sequence of actions to calibrate and/or center computing device, such as rocking computing device side to side, back and forth, moving computing device in a figure eight, any other suitable sequence, or any suitable combination thereof.

In some implementations, after computing device 112 begins generating instructions for manipulating the interactive content, computing device 112 can send the instructions to the media receiving device (e.g., media streaming device 102, digital media receiver 152, etc.) and/or the server (e.g., content delivery server 120) that is generating the interactive content.

If process 400 determines that one or more instructions to manipulate the interactive content have not been received ("NO" at 408), process 400 can return to 408 and continue to wait for instructions. Otherwise, if process 400 determines that one or more instructions to manipulate the interactive content have been received ("YES" at 408), process 400 can proceed to 410.

At 410, process 400 can cause the interactive content to be updated based on the instructions received from computing device 112. In some implementations, the interactive content can be updated using any suitable technique or combination of techniques. For example, an object depicted in the interactive content can be updated such that it appears that the object has been rotated based on an instruction to rotate the object.

In some implementations, the interactive content can be updated at the server before being transmitted as a stream of video to the media receiving device (e.g., media streaming device 102, digital media receiver 152, etc.) for which content was requested at 402. In such implementations, the instructions generated by computing device 112 can be received by the server (e.g., from computing device 112, relayed through media streaming device 102, relayed through digital media receiver 152, etc.).

In some implementations, at least a portion of the interactive content can be updated at the media receiving device (e.g., media streaming device 102, digital media receiver 152, etc.). In such implementations, the interactive content can be transmitted to the media receiving device as content (e.g., such as objects, models, etc.) that is then used to generate the interactive content at the media receiving device. In such implementations, the instructions generated by computing device 112 can be received by the media receiving device directly (e.g., over Bluetooth) or indirectly (e.g., over a local area network, the Internet, etc.). In some implementations, the interactive content can normally be updated by content delivery server 120, but updating of the interactive content can be performed by the media receiving device if communication between computing device 112 and content delivery server 120 is significantly delayed. In some implementations, the amount of interaction that is permitted can be reduced when the media receiving device is updating the interactive content.

At 412, process 400 can cause the updated interactive content to be presented by the media receiving device. In some implementations, as described above in connection with 410, the updated interactive content can be streamed to the media receiving device from a server (e.g., content delivery server 120) as video to be played back by the media receiving device. The media receiving device, upon receiving the updated interactive content can present the updated interactive content (e.g., using a display of media playback device 106). Additionally or alternatively, in some implementations, the media receiving device can generate the updated interactive content. In such implementations, the media receiving device can present the updated interactive content (e.g., using a display of media playback device 106) as it is generated.

At 414, process 400 can determine whether a request for additional information about the interactive content that is currently being presented has been received from computing device 112. In some implementations, a user can request additional information and/or can request to perform some action in connection with the interactive content. For example, if the interactive content is an advertisement that is related to a particular product or products, a user can provide user input to computing device 112 to request that it navigate to a user interface for purchasing the product. In some implementations, the request for more information can be sent in response to any suitable input from the user. For example, the user can open the application associated with the content requested at 402 and/or the application for controlling the media receiving device, and select a user interface element presented by the application. In such an example, the user can open the application using any suitable technique or combination of techniques, such as by navigating to and/or launching the application through the operating system computing device 112, by performing an action to open the application from the notification sent at 406, etc. As another example, the user can provide a voice input to a digital assistant provided through computing device 112 indicating that the user would like more information about the interactive content.

If process 400 determines that a request for more information has not been received ("NO" at 414), process 400 can return to 408 to wait for instructions. Otherwise, if process 400 determines that a request for more information has not been received ("YES" at 414), process 400 can proceed to 416.

At 416, process 400 can cause computing device 112 to present additional information related to the interactive content that was being presented when the request for more information was received. In some implementations, process 400 can cause computing device 112 to present the additional information using any suitable technique or combination of techniques. For example, when the user causes the application to be opened, process 400 can cause a link and/or user interface element to the additional information to be presented in a user interface of the application, such that selection of the link and/or user interface element causes the additional information to be requested from a particular address. As another example, when the user requests the additional information, process 400 can cause a notification to be sent to computing device 112, such that selection of the notification causes computing device to request the additional information.

In some implementations, the additional information can be presented using any suitable technique or combination of techniques. For example, the additional information can be presented as a web page in a web browser or other suitable application. As another example, the additional information can be presented in an application related to the interactive content. As yet another example, if the interactive content is an advertisement for a product available through an application installed on computing device 112, process 400 can cause the application to be launched. As still another example, if the interactive content is related to an application that is not installed on computing device, process 400 can cause computing device 112 to present a user interface for installing the application.

Figure 5A:
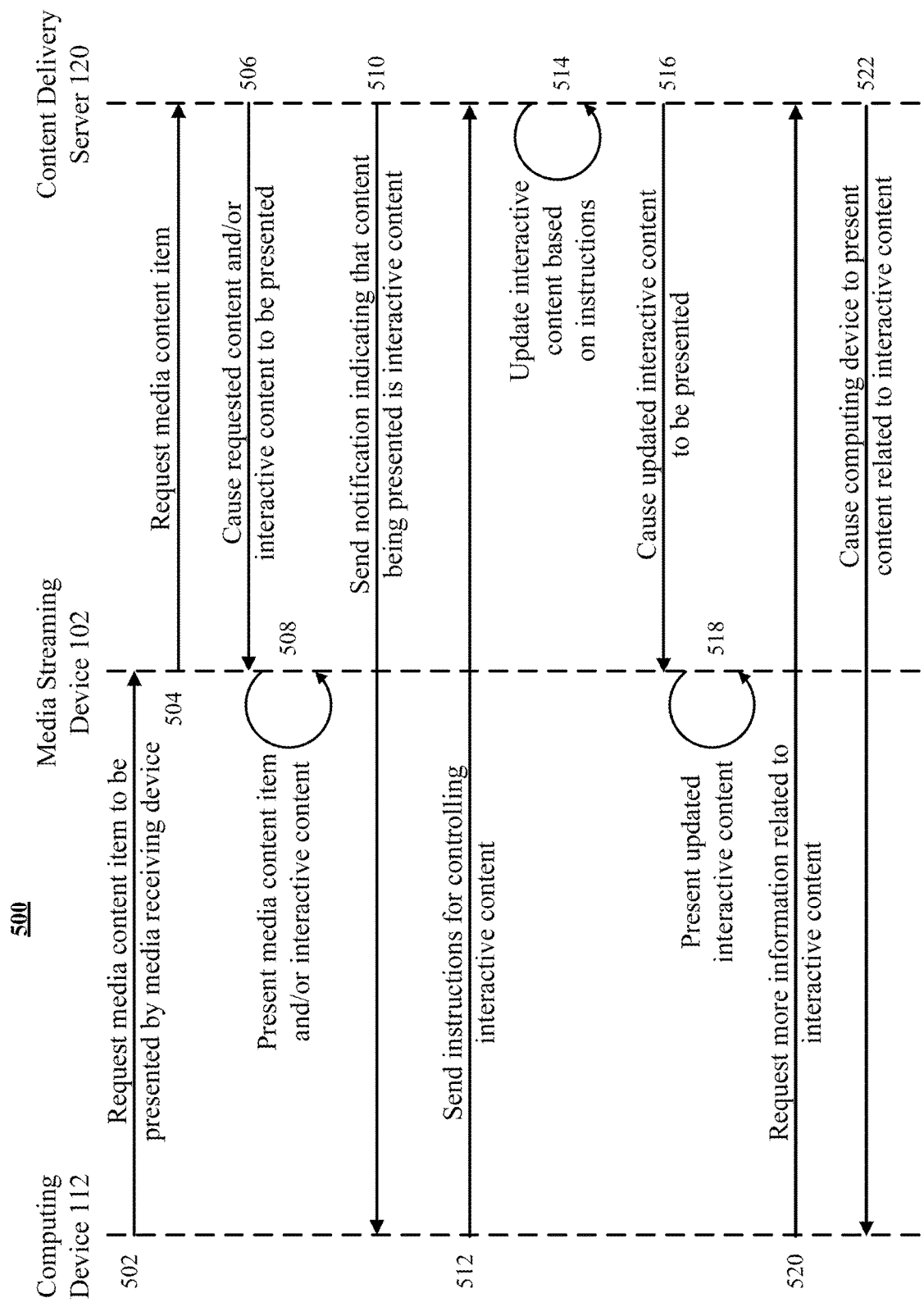
FIGS. 5A and 5B show examples of information flow between a computing device, a media receiving device and a content delivery server in accordance with some implementations of the disclosed subject matter.

FIG. 5A shows an example 500 of information flow between computing device 112, media streaming device 102 and content deliver server 120 in accordance with some implementations of the disclosed subject matter. As shown in FIG. 5A, at 502 computing device 112 can send a request to media streaming device 102 for media streaming device 102 to present one or more media content items. As described above in connection with 402 of FIG. 4, the request can include identifying information of a source of the content (e.g., a web address associated with the source, identifying information of an application associated with the source, etc.) and identifying information of the content to be presented (e.g., a sequence of characters associated with the content item). In some implementations, the identifying information for the source and the identifying information for the content can be combined as, for example, a URL.

At 504, media streaming device 102 can send a request for the media content item or media content items to a source (e.g., content deliver server 120) based on the identifying information sent from computing device 112 at 502.

At 506, content delivery server 120 can cause the requested content and/or interactive content to be presented by media streaming device 102 based on the request sent at 504. As described above in connection with 404 of FIG. 4, the interactive content can be an advertisement that was not explicitly requested by media streaming device 102 and/or can be content associated with the requested content (e.g., as supplementary content).

At 508, media streaming device 102 can present the received media content item and/or interactive content using, for example, display 108 of media playback device 106. As described above in connection with 404 of FIG. 4, in some implementations, content delivery server 120 can generate the interactive content and send a stream of video to media streaming device 102, which can present the video at 508. Alternatively, as described above in connection with 404 of FIG. 4, content delivery server 120 can send elements that can be used by media streaming device 102 to generate the interactive content.

At 510, content delivery server 120 can cause a notification to be sent to computing device 112 indicating that the content being presented by media streaming device 102 is interactive content. In some implementations, the notification can be sent using a different server (e.g., as part of a push notification system associated with the operating system of computing device 112 and/or an application installed on computing device 112) other than content delivery server 120. In some implementations, the notification can be sent at 510 using any suitable technique or combination of techniques, such as techniques described above in connection with 406 of FIG. 4.

At 512, computing device 112 can send instructions for controlling the interactive content to content delivery server 120. In some implementations, the instructions can be generated using any suitable technique or combination of techniques, such as techniques described above in connection with 408 of FIG. 4.

At 514, content delivery server 120 can update the interactive content based on the instructions received from computing device 112 to control presentation of the interactive content. In some implementations, content delivery server 120 can use any suitable graphics rendering technique or combination of techniques to update the interactive content based on the instructions provided from computing device 112. For example, content delivery server 120 can update the interactive content such that it appears that an object presented within the interactive content rotates in response to computing device 112 giving an instruction to rotate the interactive content. As another example, content delivery server 120 can update the interactive content such that it appears that a series of objects move across display 108 of media playback device 106 in response to computing device 112 giving an instruction to scroll through a series of objects in the interactive content (e.g., based on lateral translation of computing device 112). As yet another example, content delivery server 120 can update the interactive content such that it appears large (i.e., by performing a zoom operation) in response to computing device 112 giving an instruction to zoom in on the interactive content (e.g., based on translation of computing device 112 in a direction assumed to be toward the user). As still another example, content delivery server 120 can update the interactive content such that it is moved to a corner of the video stream (e.g., as an overlay on a requested content item) such that the interactive content appears in a corner of display 108 of media playback device 106 in response to computing device 112 giving an instruction to shrink the interactive content (e.g., based on a touch being received at a corresponding corner of a touchscreen of computing device 112).

At 516, content delivery server 120 can cause the updated interactive content to be presented by media streaming device 102. As described above in connection with 508, the updated interactive content can be sent as part of a stream of video depicting the interactive content. At 518, media streaming device 102 can present the updated interactive content.

At 520, computing device 112 can request additional information about the interactive content currently being presented by media streaming device 102, and at 522, content delivery server 120 can cause computing device 112 to present content related to the interactive content with additional information about the interactive content. In some implementations, computing device 112 can initiate the request for additional information using any suitable technique or combination of techniques, such as techniques described above in connection with 414 of FIG. 4. In some implementations, content delivery server 120 (and/or any other suitable server) can cause computing device 112 to present the additional information using any suitable technique or combination of techniques, such as techniques described above in connection with 416 of FIG. 4.

Figure 5B:
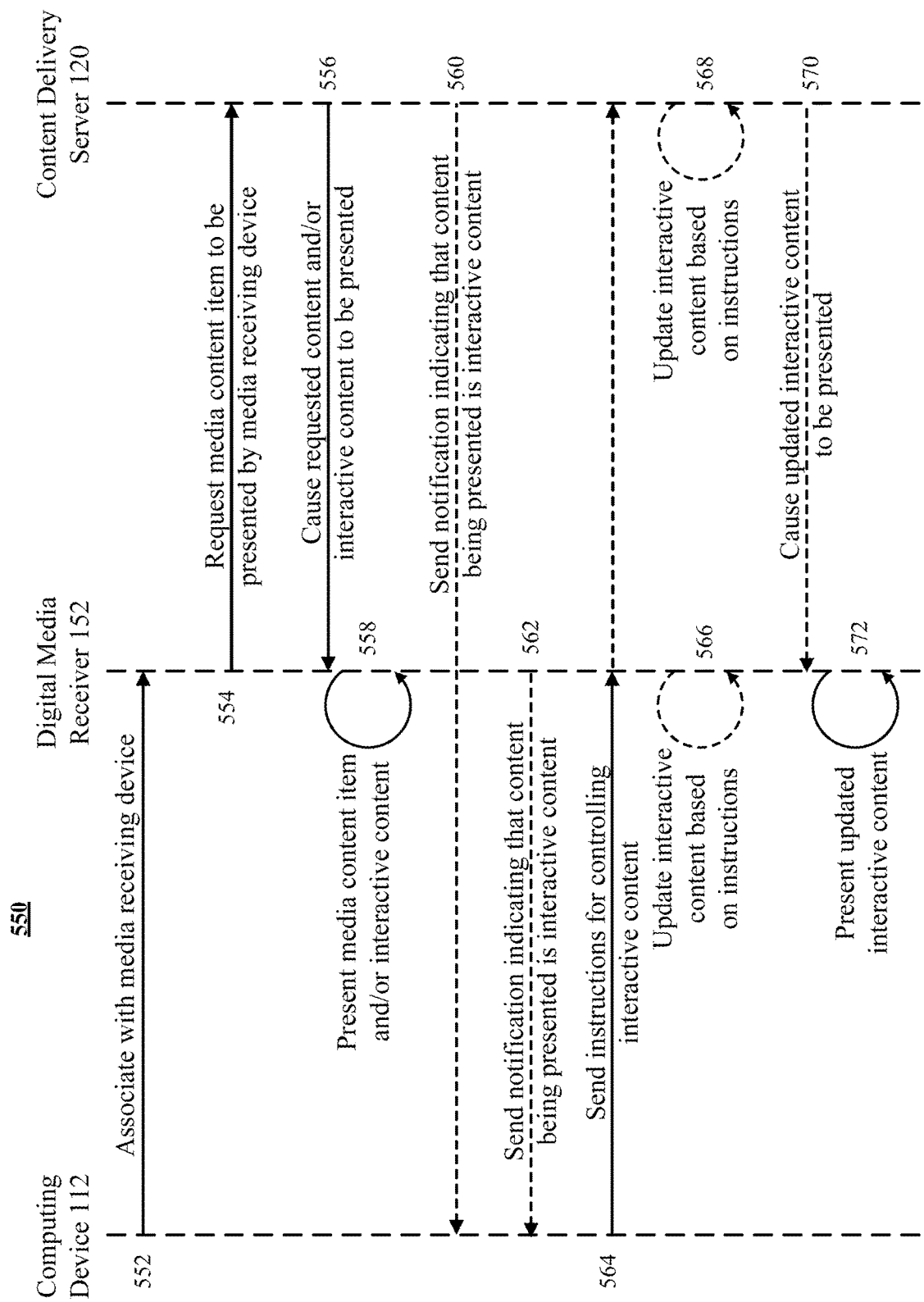

FIG. 5B shows an example 550 of information flow between computing device 112, media streaming device 102 and content deliver server 120 in accordance with some implementations of the disclosed subject matter. As shown in FIG. 5B, at 552 computing device 112 can associate with digital media receiver 152. In some implementations, computing device 112 and digital media receiver 152 can associate using any suitable technique or combination of techniques. For example, computing device 112 and digital media receiver 152 can be associated based on computing device 112 being used to control one or more operations of digital media receiver 152 (e.g., as described above in connection with 406 of FIG. 4). As another example, computing device 112 and digital media receiver 152 can be associated based on a user of computing device 112 initiating a connection with digital media receiver 152 (e.g., over a local area network, using a short-range wireless communication protocol, etc.). As yet another example, computing device 112 and digital media receiver 152 can be associated based on the same user account being used to sign in to the same application associated with a service from which content is requested (e.g., as described below in connection with 554) on both computing device 112 and digital media receiver 152, and both devices being connected to the same local area network.

At 554, digital media receiver 152 can send a request for one or more media content items to content delivery server 120. In some implementations, the request for the one or more media content items can be initiated using any suitable technique or combination of techniques, such as techniques described above in connection with FIG. 1B and 402 of FIG. 4.

At 556, content deliver server 120 can cause the requested content and/or interactive content to be presented by digital media receiver 152 based on the request sent at 554. As described above in connection with 404 of FIG. 4, the interactive content can be an advertisement that was not explicitly requested by digital media receiver 152 and/or can be content associated with the requested content (e.g., as supplementary content).

At 558, digital media receiver 152 can present the received media content item and/or interactive content using, for example, display 108 of media playback device 106. As described above in connection with 404 of FIG. 4, in some implementations, content delivery server 120 can send graphical elements that can be used by digital media receiver 152 to generate the interactive content for presentation at 558. Additionally or alternatively, in some implementations, content delivery server 120 can generate the interactive content and send a stream of video to digital media receiver 152, which can present the video at 558.

At 560, content delivery server 120 can cause a notification to be sent to computing device 112 indicating that the content being presented by digital media receiver 152 is interactive content. In some implementations, the notification can be sent using a different server (e.g., as part of a push notification system associated with the operating system of computing device 112 and/or an application installed on computing device 112) other than content delivery server 120. In some implementations, the notification can be sent at 560 using any suitable technique or combination of techniques, such as techniques described above in connection with 406 of FIG. 4. Additionally or alternatively, in some implementations, digital media receiver 152 can cause the notification to be sent to computing device 112 at 562.

At 564, computing device 112 can send instructions for controlling the interactive content to digital media receiver 152 and/or content delivery server 120. In some implementations, the instructions can be generated using any suitable technique or combination of techniques, such as techniques described above in connection with 408 of FIG. 4.

At 566, digital media receiver 152 can update the interactive content based on the instructions received from computing device 112 to control presentation of the interactive content. In some implementations, digital media receiver 152 can use any suitable graphics rendering technique or combination of techniques to update the interactive content based on the instructions provided from computing device 112, such as techniques described above in connection with 514 of FIG. 5A. Additionally or alternatively, at 568, content delivery server 120 can update the interactive content based on the instructions received from computing device 112 to control presentation of the interactive content.

At 570, in some implementations in which the interactive content is updated by content deliver server 120, content delivery server 120 can cause the updated interactive content to be presented by digital media receiver 152. As described above in connection with 508, the updated interactive content can be sent as part of a stream of video depicting the interactive content. At 572, digital media receiver 152 can present the updated interactive content generated by digital media receiver 152 and/or received from content delivery server 120.

Although not shown in FIG. 5B, in some implementations, computing device 112 can request, receive and/or present additional information about the interactive content being presented at 572 using similar techniques as described above in connection with 520 and 522 of FIG. 5B. However, the request for additional information can, in some implementations, be received by digital media receiver 152.

In some implementations, the mechanisms described herein, can include server-side software, server-side hardware, client-side software, client-side hardware, or any suitable combination thereof. For example, the mechanisms can encompass a computer program written in a programming language recognizable by hardware processor 312, hardware processor 322, and/or hardware processor 332 (e.g., a program written in a programming language, such as, Java, C, Objective-C, C++, C#, Javascript, Visual Basic, or any other suitable approaches). As another example, the applications can encompass code corresponding to one or more Web pages or Web page portions (e.g., via any suitable encoding, such as Hyper Text Markup Language ("HTML"), Dynamic Hyper Text Markup Language ("DHTML"), Extensible Markup Language ("XML"), JavaServer Pages ("JSP"), Active Server Pages ("ASP"), Cold Fusion, or any other suitable approaches).

In some implementations, any suitable computer readable media can be used for storing instructions for performing the functions and/or processes described herein. For example, in some implementations, computer readable media can be transitory or non-transitory. For example, non-transitory computer readable media can include media such as magnetic media (such as hard disks, floppy disks, etc.), optical media (such as compact discs, digital video discs, Blu-ray discs, etc.), semiconductor media (such as flash memory, electrically programmable read only memory (EPROM), electrically erasable programmable read only memory (EEPROM), etc.), any suitable media that is not fleeting or devoid of any semblance of permanence during transmission, and/or any suitable tangible media. As another example, transitory computer readable media can include signals on networks, in wires, conductors, optical fibers, circuits, any suitable media that is fleeting and devoid of any semblance of permanence during transmission, and/or any suitable intangible media.

It should be understood that the above described steps of the processes of FIGS. 4, 5A and 5B can be executed or performed in any order or sequence not limited to the order and sequence shown and described in the figures. Also, some of the above steps of the processes of FIGS. 4, 5A and 5B can be executed or performed substantially simultaneously where appropriate or in parallel to reduce latency and processing times.

It should also be noted that, as used herein, the term mechanism can encompass hardware, software, firmware, or any suitable combination thereof.

Accordingly, systems, methods, and media for interacting with content using a second screen device are provided.

Although the invention has been described and illustrated in the foregoing illustrative implementations, it is understood that the present disclosure has been made only by way of example, and that numerous changes in the details of implementation of the invention can be made without departing from the spirit and scope of the invention, which is limited only by the claims that follow. Features of the disclosed implementations can be combined and rearranged in various ways.

What is claimed is:

1. A method for interacting with content using second screen devices, the method comprising:
   receiving, by a media streaming device, a stream of video content items;
   causing, by the media streaming device, the stream of video content items to be displayed on a display device connected to the media streaming device using a High-Definition Multimedia Interface (HDMI) connection;
   detecting that a video content item in the stream of video content items contains interactive content;
   receiving, by the media streaming device and from a mobile device in wireless communication with the media streaming device, an indication that the mobile device includes a sensor for detecting movement;
   in response to receiving the indication, receiving, by the media streaming device from the mobile device, a first instruction to manipulate the interactive content; and
   in response to receiving the first instruction to manipulate the interactive content, causing a first manipulated version of the interactive content to be displayed on the display device.

2. The method of claim 1, wherein the first instruction to manipulate the interactive content includes an instruction to manipulate an object.

3. The method of claim 1, wherein the interactive content is advertising content that does not correspond to the video content item in the stream of video content items.

4. The method of claim 1, further comprising:
   receiving a second instruction to manipulate the interactive content from the mobile device; and
   in response to receiving the second instruction to manipulate the interactive content from the mobile device, causing a second manipulated version of the interactive content to be displayed on the display device.

5. The method of claim 1, further comprising:
receiving a request for information related to the interactive content from the mobile device; and
in response to receiving the request for information related to the interactive content from the mobile device, causing the information related to the interactive content to the mobile device.

6. The method of claim 1, further comprising receiving a request from an application installed on the mobile device to present the stream of video content items on the display device.

7. A system for interacting with content using second screen devices, the system comprising:
a media streaming device that:
receives a stream of video content items;
causes the stream of video content items to be displayed on a display device connected to the media streaming device using a High-Definition Multimedia Interface (HDMI) connection;
detects that a video content item in the stream of video content items contains interactive content;
receives, from a mobile device in wireless communication with the media streaming device, an indication that the mobile device is in a readily accessible state;
in response to receiving the indication, receives, from the mobile device, a first instruction to manipulate the interactive content; and
in response to receiving the first instruction to manipulate the interactive content, causes a first manipulated version of the interactive content to be displayed on the display device.

8. The system of claim 7, wherein the first instruction to manipulate the interactive content includes an instruction to manipulate an object.

9. The system of claim 7, wherein the interactive content is advertising content that does not correspond to the video content item in the stream of video content items.

10. The system of claim 7, wherein the media streaming device also:
receives a second instruction to manipulate the interactive content from the mobile device; and
in response to receiving the second instruction to manipulate the interactive content from the mobile device, causes a second manipulated version of the interactive content to be displayed on the display device.

11. The system of claim 7, wherein the media streaming device:
receives a request for information related to the interactive content from the mobile device; and
in response to receiving the request for information related to the interactive content from the mobile device, causes the information related to the interactive content to the mobile device.

12. The system of claim 7, wherein the media streaming device also receives a request from an application installed on the mobile device to present the stream of video content items on the display device.

13. A non-transitory computer-readable medium containing computer executable instructions that, when executed by a processor, cause the processor to perform a method for interacting with content using second screen devices, the method comprising:
receiving, by a media streaming device, a stream of video content items;
causing, by the media streaming device, the stream of video content items to be displayed on a display device connected to the media streaming device using a High-Definition Multimedia Interface (HDMI) connection;
detecting that a video content item in the stream of video content items contains interactive content;
receiving, by the media streaming device and from a mobile device in wireless communication with the media streaming device, an indication that the mobile device includes a sensor for detecting movement;
in response to receiving the indication, receiving, by the media streaming device from the mobile device, a first instruction to manipulate the interactive content; and
in response to receiving the first instruction to manipulate the interactive content, causing a first manipulated version of the interactive content to be displayed on the display device.

14. The non-transitory computer-readable medium of claim 13, wherein the first instruction to manipulate the interactive content includes an instruction to manipulate an object.

15. The non-transitory computer-readable medium of claim 13, wherein the interactive content is advertising content that does not correspond to the video content item in the stream of video content items.

16. The non-transitory computer-readable medium of claim 13, wherein the method further comprises:
receiving a second instruction to manipulate the interactive content from the mobile device; and
in response to receiving the second instruction to manipulate the interactive content from the mobile device, causing a second manipulated version of the interactive content to be displayed on the display device.

17. The non-transitory computer-readable medium of claim 16, wherein the method further comprises:
receiving a request for information related to the interactive content from the mobile device; and
in response to receiving the request for information related to the interactive content from the mobile device, causing the information related to the interactive content to the mobile device.

18. The non-transitory computer-readable medium of claim 13, wherein the method further comprises receiving a request from an application installed on the mobile device to present the stream of video content items on the display device.

* * * * *